Patented Aug. 11, 1953

2,648,697

UNITED STATES PATENT OFFICE 2,648,697

METHOD OF MAKING ORGANIC CARBONATE

Charles Adam Heiberger, Nitro, W. Va., assignor to Ohio-Apex, Inc., Nitro, W. Va., a corporation of West Virginia No Drawing. Application April 10, 1951, Serial No. 220,361

6 Claims. (Cl. 260—463)

1

The present invention relates to a method of preparing organic carbonates from organic chlorides of the type broadly termed as allyl chlorides and substituted allyl chlorides. The principal object of the present invention is the provision of methods by which carbonates of general formula

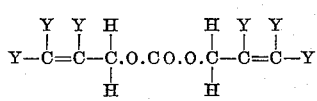

wherein Y represents hydrogen, chlorine or the methyl group, may be prepared in such quantity and at such cost as will insure the availability of these carbonates as commercially useful substances. Other and more detailed objects will be apparent from the following description of the invention.

The reaction with which this invention is concerned is essentially that between the described chloride and a carbonate of sodium, but such chlorides and such carbonates are not effective when used alone to achieve any noticeable yield of the carbonates of the type above referred to. However, I have found that if the reaction is catalyzed by the addition to the reaction mixture of certain amines, the reaction moves efficiently to produce substantial yields of the carbonates. These amines are catalytic in action. They are not exhausted during the reaction. The amount of amine which, if present, will promote the reaction has no quantitative reactive relation to the amount of the reactants. The reaction will proceed so long as a very small amount of such catalytic compound is present. It is, of course, desirable to use as little as possible of the catalytic compound in order to minimize cost. Generally an amount of the catalyst corresponding to about .01 to .1 mol per mol of the organic chloride reactant produces good yields. Greater amounts are not harmful except in so far as bulk affects handling of the reaction mixture and may therefore somewhat reduce the yield.

The carbonate component of the reaction is either sodium carbonate or sodium bicarbonate, the latter being the equivalent of the first except that the formation of ether by-products may be somewhat higher when the bicarbonate is used. Both are herein comprehended by the term "carbonate of sodium." A molar excess of the carbonate compound component usually promotes the efficiency of the reaction. The effect produced by such an excess is one of efficiency resulting only in better yield. Economically a molar excess of carbonate is desirable, but amounts above about 200% excess usually cease to be economical, from the standpoint of production in bulk, because yield does not further increase to justify the reactant cost. In addition, the mixing or handling difficulties created by an "over load" of the carbonate may actually decrease yield below optimums which could otherwise be obtained.

2

Chloride reactants to which this invention refers are exemplified by such compounds as: 3-chlor propene-1; 3-chlor 2-methyl propene-1; 3-chlor 1-methyl propene-1; 1,3-dichlor 2-methyl propene-1; 2,3-dichlor propene-1; 1,2,3-trichlor propene-1; 2,4-dichlor butene-2; 1,1,3-trichlor 2-methyl propene-1; 4-chlor 3-methyl butene-2; 4-chlor 2-methyl butene-2; 2,4-dichlor 3-methyl butene-2; 3,4-dichlor 2-methyl butene-2; 4-chlor 2,3-dimethyl butene-2; 1,1,2,3-tetrachlor propene-1. More conveniently these compounds can be described as compounds of the general formula

wherein Y represents a group selected from the class consisting of hydrogen, chlorine and the methyl group.

The catalytic compounds or catalysts used in the reaction are of the type in which the valences of the nitrogen

are each satisfied by attachment to a carbon atom of an organic group. The specific catalytic compounds of this type which I have found useful to promote the reaction between the above mentioned chlorides and carbonate of sodium are certain tertiary amines and quaternary ammonium compounds, certain substituted morpholines, morpholinium halides and certain substituted ureas. These nitrogen compounds are selected from the class consisting of the compounds set forth in Table I:

Table I

1. Tertiary amines of general formula $R_2R''N$, wherein R represents an unsubstituted alkyl group having less than 5 carbon atoms and wherein R'' represents a group selected from the class consisting of unsubstituted alkyl groups of less than 19 carbon atoms, substituted ethyl, substituted propyl and ring substituted benzyl groups, wherein one hydrogen is replaced by a group selected from the class consisting of OH and $NR'_2$ in which R' represents a group selected from the class consisting of hydrogen and unsubstituted alkyl groups of less than 5 carbon atoms, substituted alkyl groups of less than 19 carbon atoms, no more than 6 of which are ring bound carbons, wherein hydrogen is replaced with a group selected from the class consisting of the substituent groups phenyl, phenoxy, alkenyl, alkenyloxy, alkyl, alkoxy, halogen substituted phenyl and halogen substituted phenoxy, and any of said substituent groups wherein a hydrogen thereof is replaced by another of said substituent groups, the halogen contained in said halogen substituted groups being of atomic number greater than 9 and replacing less than 3 hydrogens of said group;

2. Ammonium compounds corresponding to any of the general formulae: R₂R''₂NX,

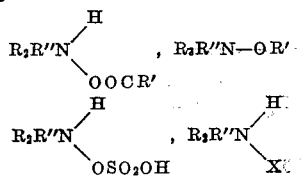

wherein R, R' and R'' are as above defined and X represents a halogen;

3. Substituted morpholines of general formula OC₄H₈N—R, wherein R is as above defined;

4. Morpholinium halides of general formula OC₄H₈N—RR''X, wherein R, R'' and X are as above defined;

5. Ureas of general formula

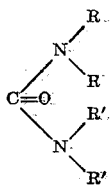

wherein R and R' are as above defined; and

6. Triethanolamine.

The reaction mixture should be nonaqueous in the sense that water is not present as a reaction medium or menstruum. Unsatisfactory yields are obtained when over about 2% of free water by weight of the total reaction mass is present. Whenever possible, conditions should be adjusted to exclude moisture, and preferably the free moisture content of the reaction mixture should be less than 1% by weight for best results. Water present in the mixture and combined physically or chemically to the extent that it is not available as moisture does not seriously affect the reaction.

When there is present in the reaction mixture a chloride of the type above defined, carbonate of sodium and catalytic compound, the reaction proceeds to yields which are substantial as compared with the negligible yields produced in the absence of the catalyst. This improved effect is not inhibited by the presence of inert substances in the reaction mixture which, at worst, because of mechanical blocking or mass action effects, may merely diminish the yield.

The reaction does not normally proceed with any real effect below about 60° to 70° C. The efficiency of the reaction increases as temperature rises and usually will be found to be commercially satisfactory at between about 80° and 150° C., the optimum yield being usually achieved within this range. The allyl and substituted allyl chlorides are sufficiently stable to tolerate reaction temperatures as high as 200° C. without substantial loss of the chloride reactant, and therefore such temperatures can be used, although in some cases yields will be reduced.

Specific examples of the usefulness of the catalytic compounds are set forth in the following Table II. Each example in this table represents the result obtained when a reaction mixture composed of carbonate reactant, the named chloride reactant, and the named catalyst was reacted for the indicated number of hours and at the indicated temperature, and the crude reaction product distilled or otherwise treated to obtain the carbonate. The carbonate reactant was carbonate of sodium used in equivalent molar amounts in the reaction involving 3-chlor propene-1 and in molar excess of the chloride reactant in the other reactions.

Table II

| Chloride Reactant | Catalyst Compound | Am't of Catalyst per mol of Chloride Reactant | Am't of Carbonate Product Formed, Percent of Theoretical | Temp. of Reaction, °C. | Reaction Time, Hours |
|---|---|---|---|---|---|
| 3-chlor propene-1 | Triethylamine | .072 | 56 | 125 | 20 |
| Do | Diethyl aminopropyl amine | .036 | 47 | 125 | 15 |
| Do | Dimethyl, octylphenoxy ethoxyethyl amine | .018 | 20 | 125 | 15 |
| Do | Dimethyl, hydroxy benzyl amine | .036 | 33 | 125 | 15 |
| Do | Dimethyl, dodecyl, benzyl ammonium chloride | .072 | 22 | 125 | 20 |
| Do | Dimethyl, dodecyl, benzyl ammonium fluoride | .072 | 7 | 120 | 20 |
| Do | Triethyl ammonium butyrate | .036 | 65 | 125 | 15 |
| Do | Dimethyl, hydroxyethyl ammonium sulfate | .036 | 23 | 125 | 15 |
| Do | 1,1 Dimethyl urea | .036 | 30 | 125 | 15 |
| Do | N-methyl morpholine | .072 | 29 | 125 | 20 |
| Do | Ethyl, benzyl morpholinium bromide | .036 | 33 | 120 | 15 |
| 3-chlor 2-methyl propene-1 | Triethylamine | .072 | 52 | 125 | 20 |
| Do | do | .072 | 64 | 105 | 20 |
| Do | N,N Dimethyl, benzyl amine | .036 | 29 | 125 | 15 |
| Do | Diethyl, hydroxyethyl, orthochlor benzyl ammonium chloride | .036 | 8 | 120 | 20 |
| Do | Trimethyl, hexadecyl ammonium bromide | .072 | 14 | 105 | 20 |
| Do | Trimethyl, benzyl ammonium butoxide | .036 | 4 | 125 | 15 |
| Do | Dimethyl, benzyl ammonium hydrochloride | .036 | 42 | 125 | 15 |
| Do | N-ethyl morpholine | .036 | 5 | 110 | 15 |
| Do | Triethanol amine | .072 | 8 | 105 | 20 |
| Do | Tetrabutyl urea | .036 | 5 | 100 | 15 |
| 2,4-dichlor butene-2 | Triethylamine | .072 | 30 | 110 | 20 |
| Do | Dimethyl, octadecenyl amine | .036 | 35 | 125 | 15 |
| Do | Dimethyl, hydroxyisopropylamine | .072 | 6 | 125 | 15 |
| Do | Tributyl amine | .036 | 22 | 125 | 15 |
| Do | Dimethyl, octadecyl, benzyl ammonium chloride | .036 | 39 | 120 | 15 |
| Do | Dimethyl, butoxymethyl, benzyl ammonium chloride | .036 | 26 | 110 | 15 |
| Do | Ethyl, dimethyl, octadecenyl ammonium bromide | .018 | <5 | 125 | 15 |
| Do | Dimethyl, dodecyl, benzyl ammonium iodide | .018 | 38 | 125 | 15 |
| Do | Triethyl ammonium hydroiodide | .036 | 7 | 125 | 15 |
| Do | Dimethyl, benzyl ammonium acetate | .036 | 30 | 120 | 15 |
| Do | Methyl, butoxymethyl morpholinium chloride | .036 | 6 | 125 | 15 |
| Do | 1,1 Dibutyl urea | .036 | 39 | 120 | 15 |
| Do | Triethanol amine | .072 | 15 | 100 | 15 |

In general I prefer to use those catalysts defined by the general formula $R_2R''N$, and of the compounds responding to this formula those in which the R and the R'' are unsubstituted alkyl groups appear in many instances to be the most active. Generally the tertiary amines having three unsubstituted alkyl groups will be, because of efficiency, availability and cost, of greatest usefulness in large scale commercial production and, of such amines, triethylamine is preferred. As the tabulated examples indicate, however, all of the described catalysts are useful to positively promote carbonate formation in the otherwise practically inactive reaction between the defined chlorides and carbonate of sodium, and thus the choice of the catalyst may depend upon availability, cost and other economics of the particular operation to which the present invention may be applied.

The carbonate compounds produced by the use of the methods of this invention are particularly useful as plasticizers and extenders for resinous bodies such as plastics. They have solvent properties useful in the manufacture of vat dyes, printing inks, insecticides and smokeless powder and also useful in the application of protective coatings. Their properties likewise recommend use in various other fields such as heat transfer, lubricant compounding and textile manufacture.

This application is a continuation-in-part of my application Serial No. 87,120, filed August 12, 1949, now abandoned.

Having thus described my invention, I claim:

1. The process of making an organic carbonate including reacting at temperatures of about 50° to about 200° C. a mixture containing not more than about 2% by weight of free water and consisting essentially of carbonate of sodium, a catalyst and a compound of general formula

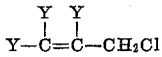

wherein Y represents a group selected from the class consisting of hydrogen, chlorine and the methyl group; said catalyst being selected from the class consisting of triethanol amine, substituted urea compounds of general formula $R_2NCONR'_2$, substituted morpholines of general formula $OC_4H_8NR$, morpholinium halides of general formula $OC_4H_8NRR''X$, and amines and ammonium compounds of general formula $R_2R''N$, $R_2R''_2NX$, $R_2R''HNX$, $R_2R''HNOOCR'$
$R_3R''NOR'$ and $R_2R''HNOSO_2OH$ wherein X represents a halogen, R represents an unsubstituted alkyl group having less than 5 carbon atoms, R' represents a group selected from the class consisting of hydrogen and unsubstituted alkyl groups of less than 5 carbon atoms, and R'' represents a group selected from the class consisting of unsubstituted alkyl groups of less than 19 carbon atoms and substituted ethyl, substituted propyl and ring substituted benzyl groups, wherein one hydrogen is replaced by a group selected from the class consisting of OH and $NR'_2$, substituted alkyl groups of less than 19 carbon atoms, no more than 6 of which are ring bound carbons, wherein hydrogen is replaced by a group selected from the class consisting of the substituent groups phenyl, phenoxy, alkenyl, alkenyloxy, alkyl, alkoxy, halogen substituted phenyl and halogen substituted phenoxy, and any of said substituent groups wherein a hydrogen thereof is replaced by another of said substituent groups, the halogen contained in said halogen substituted groups being of atomic number greater than 9 and replacing less than 3 hydrogens of said group.

2. The process of making an organic carbonate including reacting at temperatures of about 50° to about 200° C. a mixture containing not more than about 2% by weight of free water and consisting essentially of carbonate of sodium, a catalyst and a compound of general formula

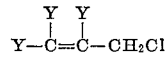

wherein Y represents a group selected from the class consisting of hydrogen, chlorine and the methyl group; said catalyst being triethylamine.

3. The process of making an organic carbonate including reacting at temperatures of about 50° to about 200° C. a mixture containing not more than about 2% by weight of free water and consisting essentially of carbonate of sodium, a catalyst and a compound of general formula

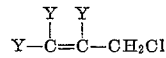

wherein Y represents a group selected from the class consisting of hydrogen, chlorine and the methyl group; said catalyst being dimethyl, butoxymethyl, benzyl ammonium chloride.

4. The process of making an organic carbonate including reacting at temperatures of about 50° to about 200° C. a mixture containing not more than about 2% by weight of free water and consisting essentially of carbonate of sodium, a catalyst and a compound of general formula

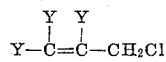

wherein Y represents a group selected from the class consisting of hydrogen, chlorine and the methyl group; said catalyst being diethyl aminopropyl amine.

5. The process of making an organic carbonate including reacting at temperatures of about 50° to about 200° C. a mixture containing not more than about 2% by weight of free water and consisting essentially of carbonate of sodium, a catalyst and a compound of general formula

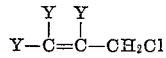

wherein Y represents a group selected from the class consisting of hydrogen, chlorine and the methyl group; said catalyst being dimethyl, octadecenyl amine.

6. The process of making an organic carbonate including reacting at temperatures of about 50° to about 200° C. a mixture containing not more than about 2% by weight of free water and consisting essentially of carbonate of sodium, a catalyst and a compound of general formula

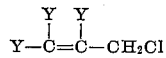

wherein Y represents a group selected from the class consisting of hydrogen, chlorine, and the methyl group; said catalyst being dimethyl, benzyl ammonium hydrochloride.

CHARLES ADAM HEIBERGER.

References Cited in the file of this patent

UNITED STATES PATENTS

| Number | Name | Date |
|---|---|---|
| 2,192,299 | Collins | Mar. 5, 1940 |
| 2,379,250 | Muskat, et al. | June 26, 1945 |
| 2,384,118 | Muskat, et al. | Sept. 4, 1945 |
| 2,395,070 | Sarbach | Feb. 19, 1946 |